United States Patent
Snapp et al.

(10) Patent No.: US 6,467,818 B1
(45) Date of Patent: Oct. 22, 2002

(54) DRILL COLLAR BOX

(75) Inventors: Douglas V. Snapp, Singapore (SG); Frank J. Carlin, Hempstead, TX (US)

(73) Assignee: Grant Prideco, L.P., The Woodlands, TX (US)

( * ) Notice: Subject to any disclaimer, the term of this patent is extended or adjusted under 35 U.S.C. 154(b) by 0 days.

(21) Appl. No.: 09/676,578

(22) Filed: Sep. 29, 2000

Related U.S. Application Data

(60) Provisional application No. 60/157,313, filed on Oct. 1, 1999.

(51) Int. Cl.[7] ............................ F16B 35/04; F16L 25/00
(52) U.S. Cl. ......................................... 285/334; 285/390
(58) Field of Search ................................ 285/333, 390, 285/334, 355

(56) References Cited

U.S. PATENT DOCUMENTS

| | | | | |
|---|---|---|---|---|
| 4,076,436 A | * | 2/1978 | Slator et al. | 285/333 |
| 4,295,751 A | * | 10/1981 | Holmberg | 285/390 |
| 4,346,920 A | * | 8/1982 | Dailey | 285/334 |
| 4,549,754 A | * | 10/1985 | Saunders et al. | |
| 4,799,844 A | * | 1/1989 | Chuang | 285/334 |
| 4,865,364 A | * | 9/1989 | Nobileau | 285/334 |
| 5,060,740 A | * | 10/1991 | Yousef et al. | |
| 5,127,784 A | * | 7/1992 | Eslinger | 285/334 |
| H1329 H | * | 7/1994 | Bailey et al. | |

* cited by examiner

*Primary Examiner*—Eric K. Nicholson
(74) *Attorney, Agent, or Firm*—Carlos A. Torres; Browning Bushman P.C.

(57) ABSTRACT

The roots of the box threads in a drill collar or heavyweight drill pipe are configured to reduce the connection stresses encountered during drilling and makeup of the connection. The thread root design in the box reduces fatigue damage caused by makeup torque and cyclic stressing of the engaged drill string connection as it is rotated around curved sections of the well bore. A conventional V-type thread form in the box is provided with an enlarged root radius having its center point offset from the centerline of the opposing thread flanks. The load flank of the thread tangentially engages the arc of the root. The stab flank of the thread is intersected by the enlarged root radius extending to a flat intersecting surface that may extend as far up as the thread pitch diameter.

9 Claims, 1 Drawing Sheet

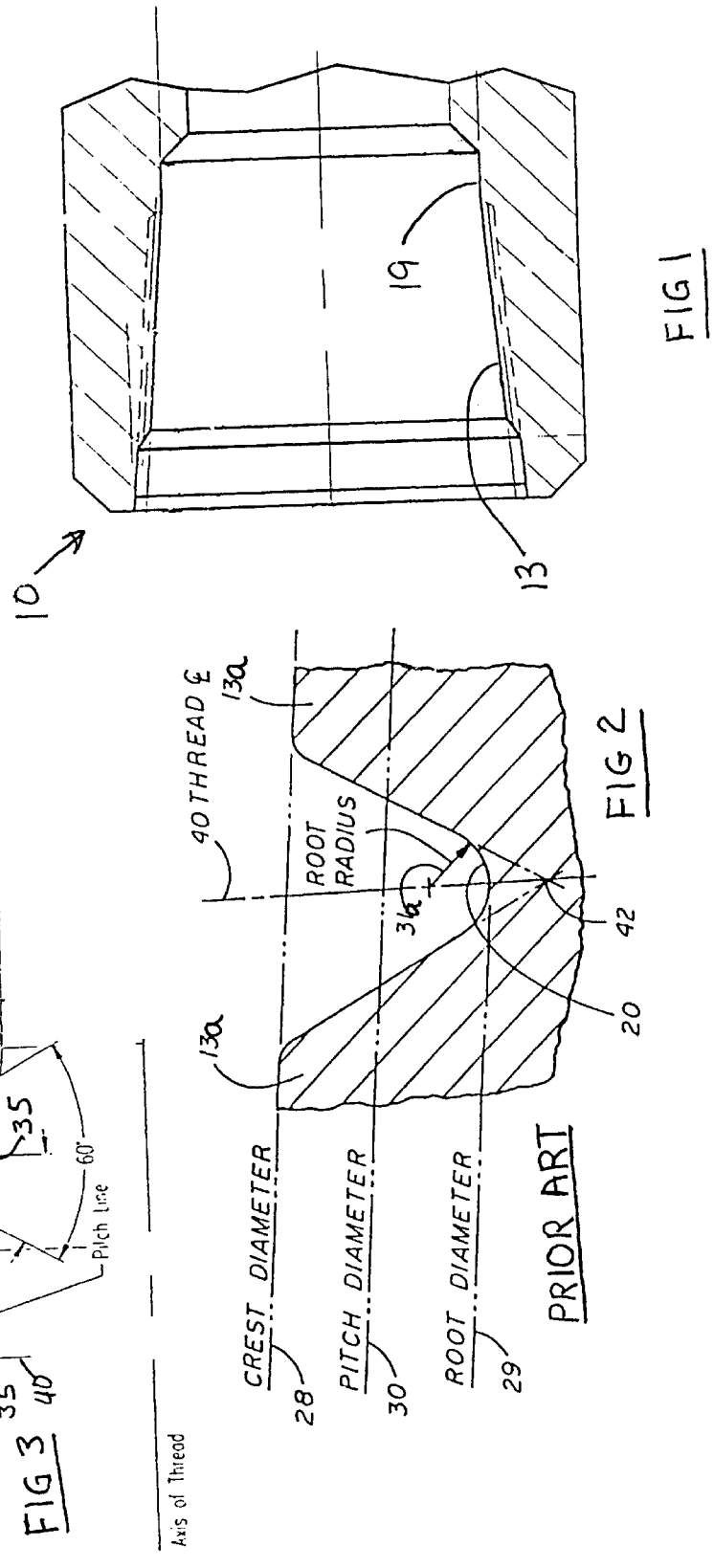

DRILL COLLAR BOX

This application claims the benefit of Provisional Application No. 60/157,313, filed Oct. 1, 1999.

FIELD OF THE INVENTION

1. Field of the Invention

The present invention relates to threaded connections employed to secure together the ends of relatively stiff, heavy tubular pipe members employed to drill through earthen formations. More particularly, the present invention relates to a thread for use in the box connection of drill collars, heavyweight drill pipe, or other relatively stiff tubular components of a drill stem assembly.

2. Setting of the Invention

Heavy, relatively stiff tubular bodies are employed at the bottom of the drill string primarily to apply weight to the drill bit and to maintain the drill string in tension. These bodies include drill collars and transition links called heavyweight drill pipe. The drill collars and heavyweight drill pipe differ from the standard drill string pipe in that bending stresses tend to concentrate in the connections of the drill collars and heavyweight drill pipe more so than in the tool joint connections of the more flexible drill pipe.

Cyclical bending during drilling induces fatigue failure in the tool joint and drill collar connections of the drill string assembly. Fatigue induced failure in the drill pipe normally occurs in the threaded male, or "pin" end of the connection, typically about two threads away from the shoulder or base of the pin thread. Fatigue induced failure of the threaded female or "box" end of a drill pipe tool joint is not typical. The failure in drill collars or heavyweight drill pipe connections typically occurs in the box, several threads from the box base or shoulder. Pin failure in this type connection is not typical.

An explanation of the cause of fatigue failure in drill collar connections is set forth in United States Statutory Invention Registration No. H1329, published Jul. 5, 1994. The Registration describes a number of changes in the construction of a drill collar connection to reduce box connection failure. One such change is to provide an enlarged thread root in the box thread in the area where most failures occur. The root radius is a single radius described as being between 0.0500 inch and 0.0625 inch. The root radius of a standard API (American Petroleum Institute) thread form is 0.038 inch. A disadvantage of a large, singe radius root is that a significant part of the thread flank is lost.

An improved thread form for the pin connection of drill pipe tool joint described in U.S. Pat. No. 4,549,754 (the "'754 patent"), incorporated herein by reference for all purposes, is assigned to the assignee of the present application. The patented thread form makes several changes in a conventional API thread to achieve the reduction in damaging stress to the pin end of the pin and box connection in a drill pipe tool joint. First, the modified thread on the pin is made capable of mating with a standard API box thread so that the modified pin thread is compatible with the box threads on equipment already present in the field. Next, the radius of the pin threads is modified to relieve the stress at the root of the threads. Third, the thread taper is modified to create an artificial pitch difference between the pin and box member and to provide for a more even distribution of loading of the thread when fully made up in a box. Forth, the new geometry of the modified connection creates a radial interference starting from the threads remote from the pin shoulder to prevent over-torquing the connection.

The thread form of the '754 patent is effective in reducing failure of the pin in the area of the base of the tool joint pin threads. The thread form is required only on the pin since box failures are rare in tool joint connections. The desired reduction in tool joint failure is thus fully attained by modifying only the pin of the connection. No significant benefit is achieved by providing the box of a tool joint with the modified thread form used on the pin and use of such thread form on the tool joint box would unnecessarily increase the cost of construction of the connection. Moreover, a connection in which the thread form was used in both the pin and the box would produce a connection in which the contact area of the stab flanks of the threads is reduced to the point of increasing the likelihood of thread gauling.

SUMMARY OF THE INVENTION

Unexpected, improved performance has been realized in the connections of drill collars and heavyweight drill pipe equipped with a modified box thread form that mirrors the thread form employed in the tool joint pin design of the '754 patent. Unlike the invention of the '754 patent, the thread form is employed in the box of the connection rather than the pin. The root of the box thread is provided with an enlarged radius and a planar stab flank surface that extends from the root toward the pitch diameter of the thread. Unlike the '754 connection, the thread taper of the drill collar connection is left unchanged in both the pin and box. The box may be mated with a conventional pin thread and may be gauged with conventional box taper, pitch diameter, and thread height gauges. A drill collar connection made with a conventional API pin and mated with the box of the present invention exhibits unexpected and significantly improved resistance to fatigue-induced box damage as compared with a conventional API pin and box drill collar connection.

From the foregoing, it will be appreciated that a primary object of the present invention is to provide a fatigue-resistant box connection for a drill collar or heavyweight drill pipe, or other stiff body tubular drill string component.

Yet another object of the present invention is to provide an improved, fatigue-resistant drill collar box connection that can be employed with a conventional, API drill collar pin connection.

It is also an important object of the present invention to provide an improved, fatigue-resistant drill collar box connection for use in a drill string assembly wherein the box connection may be gauged for taper, thread height, pitch diameter, and thread lead using conventional thread gauges.

The foregoing, as well as other, objects, features, and advantages of the present invention will be more fully appreciated and understood by reference to the following drawings, specification, and claims.

BRIEF DESCRIPTION OF THE DRAWINGS

FIG. 1 is a vertical cross-section of the box end of a drill collar tubular drill string component;

FIG. 2 is a cross sectional view of a standard API thread form; and

FIG. 3 is an enlarged vertical cross-section detailing a thread area of the drill collar of FIG. 2.

DESCRIPTION OF THE PREFERRED EMBODIMENTS

FIG. 1 illustrates a box connection 10 of the present invention suitable for use as one end connector of a drill collar. As used herein, the term "drill collar" is intended to include drill collars, heavyweight drill pipe, heavy-body pipe subs, or other relatively stiff tubular bodies used in a drill stem assembly. The connector 10 includes internal threads 13 that are designed to mate with a conventional API drill collar pin connection (not illustrated) at the end of the well tubular. The box connector 10 is provided with a conventional internal bore 19 that is devoid of any relief groove or other commonly employed stress relief configurations. The taper of the threads 13 is a standard API dimension of two inches per foot +0.00 inches, −0.030 inches. In all other pertinent dimensions, the box connector 10 is adapted to receive and mate with a conventional API drill collar pin connector.

In the conventional API thread, planes forming extensions of the opposing flanks intersect the thread centerline at 42 (FIG. 2). API specifications call for truncation of the root 20 by providing a root radius 31a equal to the distance between the root diameter 29 and point 42. In other words, the selected root radius and root truncation are equal and the center of the root radius lies on the thread centerline 40. For instance, in the API rotary shouldered connection V.038R thread form, both the root truncation and root radius are 0.038 inches. The crest diameter of the API thread form is indicated at 28, the pitch diameter is indicated at 30 and the threads are indicated at 13a.

FIG. 3 illustrates details in the construction of the drill collar box thread form of the present invention. The thread 13, with the dimensions illustrated in FIG. 3, is fabricated in the matter described in detail in the '754 patent, except that the thread form is provided in the box 10 of the drill collar connection rather than the pin, and the thread is constructed with a conventional API taper of two-inches per foot. In the preferred form of the invention, the drill collar box 10 is mated with a conventional API drill collar pin in which the taper and all other dimensions conform to the API requirements.

In the thread structure of the drill collar box thread of the present invention the root radius indicated by arrow 31 at the root 20 of the box threads 13 is increased approximately fifty percent. Where the root radius of a typical standard API thread for four threads per inch and two inches taper per foot may be 0.038 inches, the root radius 31 in the modified thread structure shown in FIG. 3 is preferably 0.057 inches. This enlarged and gentler curve 32 in the root portion may continue or may blend smoothly into another curve 33 of substantially shorter radius 34. In this case radius 31, which is 0.057 inches, blends into radius 34, which is 0.031 inches. The shorter radius curve or the single radius curve 33 is terminated at a flat surface 35 which diverges outwardly at an angle of about five degrees from a plane normal to the thread axis to a point where it engages or intersects the normally sloping wall of the unloaded thread.

Thus the radius preferably does not extend beyond a plane 41 (FIG. 3) parallel to the thread centerline and passing through the thread flank on the root side of the pitch diameter of the flank. To provide for wear of tools the line 35 between the root and flank preferably diverges outwardly at about a five degree angle to the thread centerline.

A Finite Element Analysis (FEA) of the drill collar box of the present invention revealed surprising and unexpected results.

The FEA study compared the thread form with Standard (API) thread form when applied in the box connection. The thread was modeled using a 2" taper in the box and a standard thread from on the pin using a 2" taper.

Three different models had been previously created, all using 6⅝ Regular Pin and Box with a 8" OD and 3" ID. These three models utilized standard thread forms on both box and pin.

A fourth model utilizing the thread form of the present invention in the drill collar box and standard thread form on the pin was generated for the study. No stress relief features were utilized on the box or pin connections on this model. The model configurations analyzed in the investigation are described below:

| Model 1 | Standard Pin x Standard Box |
| Model 2 | API Relief Groove Pin x API Relief Groove Box |
| Model 3 | API Relief Groove Pin x Boreback Box |
| Model 4 | Standard Pin x Box of the present invention |

Each model was made up using 50,700 ft-lbs make up torque and loaded with a bending moment simulating a 10 degree/100 ft dogleg and 20 degree/100 ft dogleg.

The results are as follows:

| Model No. | Stress At Let* of Pin (psi) | | Stress at Let* of Box (psi) | |
| --- | --- | --- | --- | --- |
| | 10 deg./100 ft | 20 deg./100 ft. | 10 deg./100 ft. | 20 deg./100 ft. |
| Model 1 | 136,297 | 172,710 | 171,734 | 240,087 |
| Model 2 | 125,628 | 152,632 | 160,528 | 220,717 |
| Model 3 | 126,192 | 153,693 | 165,394 | 226,047 |
| Model 4 | 135,579 | 170,025 | 142,441 | 196,487 |

*Let - Last engaged thread.

As can be seen, the thread form in the box of the present invention lowered the stress at the Last engaged thread of the box significantly. At a 10 degree/100 ft build rate, the stress was 17% lower than a box with no relief features, 11% lower than a box with an API Stress Relief Groove, and 13.8% lower than a boreback box. With 20 degree/100 ft build rate, the stress was 18% lower than with a standard box with no relief features, 10.9% lower than a box with an API Stress Relief Groove, and 13% lower than a boreback box. These decreases in stress are significant and unexpected.

While a preferred form of the invention has been described in detail herein, it will be appreciated by those having ordinary skill in the art that various modifications, alternative forms, and other changes may be made without departing from the spirit and scope of the present invention.

What is claimed is:

1. A box for a drill collar box adapted to mate with an API drill collar pin comprising:
    an API drill collar box having API box threads in which planes forming extensions of opposing thread flanks of said box threads intersect at a centerline between said opposing thread flanks and having a root radius that is larger than the root radius of an API drill collar box thread, and wherein said thread root is formed from the surface of revolution of two differently centered radii.

2. A box as defined in claim 1 wherein said radii are of different lengths.

3. A box as defined in claim 1 wherein said thread root includes a planar section tangentially engaging a surface of revolution of a radius of said thread root.

4. A box as defined in claim 2 wherein said thread root includes a planar section engaging the surface of revolution of the larger of said two radii.

5. A box as defined in claim 2 wherein said thread root includes a planar section engaging a surface of revolution of the smaller of said two radii.

6. A pin and box connection comprising:
   an API drill collar box having modified API box threads in which planes forming extensions of opposing thread flanks of said box threads intersect at a centerline between said opposing thread flanks is modified to form a root radius that is larger than the root radius of an API drill collar box thread, wherein said thread root is formed from the surface of revolution of two differently centered radii, and
   an API drill collar pin engaged in said box.

7. A box connector for a drill collar having an internal thread form including a thread root disposed between portions of stab and load flanks, wherein the thread root is cut with a radius larger than 0.038 in., the load flank of the thread is tangent to the arc of the root radius, the stab flank includes a planar surface that diverges at an angle of about 5 degrees from a plane normal to a central axis of said thread and intersects the stab flank portion intermediate the thread root and a pitch diameter of the thread, and the cutting radii used for forming the thread root are centered on the stab flank side of a centerline of the thread.

8. A pin and box connection comprising:
   a box connector for a drill collar having an internal thread form including a thread root disposed between portions of stab and load flanks, wherein the thread root is cut with a radius larger than 0.038 in., the load flank of the thread is tangent to the arc of the root radius, the stab flank includes a planar surface that diverges at an angle of about 5 degrees from a plane normal to a central axis of said thread and intersects the stab flank portion intermediate the thread root and a pitch diameter of the thread, and the cutting radii used for forming the thread root are centered on the stab flank side of a centerline of the thread, and
   an API pin connector threadedly engaged with said box connector.

9. A box for a drill collar comprising:
   a tapered box member having an internal V-configuration truncated thread with at least one complete thread having a load flank, an opposed unload flank and a truncated root wherein said truncated root has a first root section cut on a radius greater than the truncation of the truncated thread root and a second root section cut on a radius less than one-half the distance along a line extending perpendicular from the load flank to the pitch diameter of the opposed unload flank, said load flank being tangent to said first root section at a point of juncture of said first root section and said load flank.

* * * * *